United States Patent Office 3,089,872
Patented May 14, 1963

3,089,872
BENZOTHIAZINE AND BENZOTHIAZEPINE COMPOUNDS
John Krapcho, New Brunswick, N.J., assignor to Olin Mathieson Chemical Corporation, New York, N.Y., a corporation of Virginia
No Drawing. Filed Mar. 31, 1961, Ser. No. 99,694
9 Claims. (Cl. 260—239.3)

This invention relates to benzothiazine and benzothiazepine compounds. More particularly, this invention relates to bases having the following formula (I)
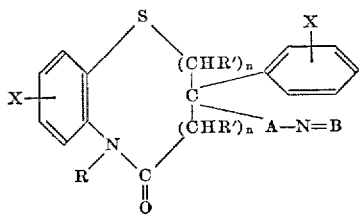

wherein R represents lower alkyl, lower alkenyl, aralkyl or aralkenyl; R' represents hydrogen and lower alkyl; X represents hydrogen, lower alkyl, halogen, halo-lower alkyl or lower alkoxy; A represents lower alkylene and N=B represents a basic nitrogen radical selected from the group consisting of amino, (lower alkyl)amino, di-(lower alkyl)amino, (hydroxy-lower alkyl)amino, di(hydroxy-lower alkyl)amino and saturated 5 to 6 membered monocyclic heterocyclic radicals of less than twelve carbon atoms; and n represents 0 or 1, at least one n representing 0, and to acid addition salts of such bases.

The terms "lower alkyl," "lower alkoxy" and "lower alkylene" include both straight and branched chain radicals of less than 8 carbon atoms, for example, methyl, ethyl, propyl, isopropyl, butyl, isobutyl, t-butyl, amyl, methoxy, ethoxy, propoxy, isopropoxy, ethylene, propylene and the like. The term "lower alkenyl" refers to straight and branched chain unsaturated hydrocarbon radicals of less than 8 carbon atoms such as allyl, butenyl, isobutenyl and the like. The aralkyl groups represented by the symbol R include monocyclic aralkyl groups such as phenyl-lower alkyl groups wherein the lower alkyl group is the same as defined above. The aralkenyl groups represented by R are monocyclic aralkenyl groups such as phenyl-lower alkenyl wherein the alkenyl group is the same as defined above, e.g. cinnamyl. The halo-lower alkyl groups may be monohalogenated such as chloromethyl or polyhalogenated such as trifluoromethyl which is preferred. All four halogens are contemplated by the symbol X. The symbols n, in representing 0 or 1, will give rise to a six-membered ring when both symbols represent 0 and a seven-membered ring when one n represents 0 and the other n represents 1.

Saturated five to six membered monocyclic heterocyclic radicals of less than 12 carbon atoms are exemplified by piperidino, (lower alkyl)piperidino, di(lower alkyl)-piperidino, (lower alkoxy)piperidino, pyrollidino, (lower alkoxy)pyrollidino, morpholino, (lower alkyl)morpholino, di(lower alkyl) morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, (e.g., N⁴-methylpiperazino), di(lower alkyl)piperazino and (lower alkoxy)piperazino.

Particularly preferred compounds are those wherein X is hydrogen or chloro, R is phenyl, A is ethylene or propylene and N=B is di(lower alkyl)amino.

The bases of this invention form acid addition salts with organic and inorganic acids. Acids useful for preparing these acid addition salts include for example inorganic acids, such as the hydrohalic acids (e.g. hydrochloric, hydrobromic, etc.), sulfuric acid, nitric acid, phosphoric acid and the like, and organic acids such as oxalic, maleic, tartaric, citric, acetic, succinic and the like.

The compounds of this invention, including the acid addition salts, affect the central nervous system and may be used as anorectics or central nervous system stimulants. They may be administered orally by incorporating a therapeutic dosage of the base or pharmaceutically acceptable acid addition salt in conventional dosage forms such as tablets, capsules, suspensions or the like.

The compounds of Formula I can be prepared by reacting a compound having one of the following formulas (II)
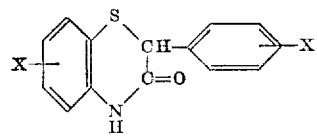

(III)
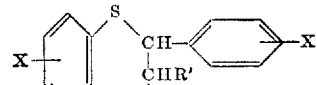

(IV)
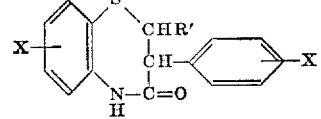

with an alkali metal compound such as sodamide, sodium hydride, or triphenylmethyl sodium and the resulting sodium salt is treated with R-halogen. This introduces the group represented by R on the nitrogen in the ring. Formation of the alkali metal salt with an alkali metal compound. Such as those enumerated above and then reaction with a compound of the formula Hal—A—N=B produces compounds of the Formula I.

These reactions are best effected at elevated temperatures, e.g. within the range of about 60° C. to the reflux temperature of the solvent. Non-polar solvents, such as ether, diethylene glycol, dimethyl ether and hydrocarbons such as benzene, toluene, xylene and the like are preferably utilized as reaction media. When compounds with a seven-membered ring system are used, it is generally preferable to use milder temperatures.

To form the acid addition salts, the free base initially formed is reacted with at least one equivalent of the appropriate acid.

The starting materials of Formulas II, III and IV may be produced, respectively, from a 2-aminothiophenol of the formula (V)
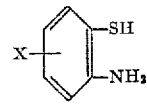

by heating with an α-halophenylacetic acid of the formula (VI)
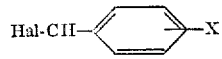

[e.g. according to Ber. 30, 23 (1897)], or with a cinnamic acid of the formula (VII)

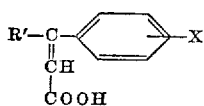

or with an α-phenylacrylic acid of the formula (VIII)

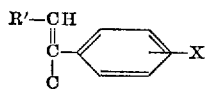

(e.g. according to J. Chem. Soc. 1927, p. 2738). The symbols have the same meaning defined previously and Hal designates a halogen, preferably bromine.

Starting materials include for example, 2-phenyl-2H-1,4 - benzothiazine - 3(4H) - one, 2 - (o - chlorophenyl)-2H-1,4 - benzothiazine - 3(4H) - one, 2 - (p - chlorophenyl) - 2H - 1,4 - benzothiazine - 3(4H) - one, 6 - trifluoromethyl - 2 - phenyl - 2H - 1,4 - benzothiazin-3(4H)-one, 2,3 - dihydro - 2 - phenyl - 1,5 - benzothiazepin-4(5H)-one, 2-(p-tolyl) - 3 - methyl - 1,5 - benzothiazepin-4(5H) - one, 2 - (o - chlorophenyl) - 2,3 - dihydro - 1,5-benzothiazepin - 4(5H) - one, 2 - (p - chlorophenyl)-2,3-dihydro - 1,5 - benzothiazepin - 4(5H)-one, 2 - (p-methoxyphenyl) - 2,3 - dihydro - 1,5 - benzothiazepin-4(5H) - one, 2 - (p - chlorophenyl) - 7 - trifluoromethyl-2,3 - dihydro - 1,5-benzothiazepin-4(5H)-one, 2-phenyl-8-trifluoromethyl-2,3 - dihydro - 1,5-benzothiazepin-4(5H)-one, 2,3-dihydro-2-methyl-3-phenyl-1,5 - benzothiazepin-4(5H) - one, 2,3 - dihydro - 3 - phenyl - 1,5 - benzothiazepin - 4(5H) - one, 7 - chloro - 2,3 - dihydro - 3-phenyl - 1,5 - benzothiazepin - 4(5H) - one, 7 - trifluoromethyl - 3 - (p - chlorophenyl) - 2,3 - dihydro - 1,5-benzothiazepin-4(5H)-one, etc.

The following examples are illustrative of the invention. All temperatures are stated on the centigrade scale.

EXAMPLE 1

*2-Dimethylaminoethyl-4-Methyl-2-Phenyl-2H-1,4-Benzothiazine-3(4H)One*

(a) A suspension of 7.2 g. of sodamide in 300 ml. of toluene is treated with a suspension of 42.9 g. of 2-phenyl-2H-1,4-benzothiazin-3(4H)-one [Ber. 30, 23 (1897)] in 600 ml. of toluene. The resulting mixture is stirred and refluxed for one hour and the pale solution is cooled to room temperature, then treated with 28.4 g. of methyl iodide in 100 ml. of toluene. After stirring for thirty minutes at room temperature, the reaction mixture is maintained at 92–105° for two hours. A heavy precipitate separates from the mixture. This is cooled and treated with 200 ml. of water. The aqueous phase is discarded and the organic layer is washed with 50 ml. of water, then concentrated under reduced pressure. When the volume of the residue is reduced to about 100 ml., a heavy precipitate separates. The mixture is diluted with 100 ml. of hexane. After cooling, the colorless product, 4-methyl-2-phenyl-2H-1,4-benzothiazin-3(4H)-one, is filtered and dried; yield 37.5 g., M.P. 145–150°. After purification from absolute alcohol, the colorless product melts at 150–152°.

(b) A suspension of 3.2 g. of sodamide in 180 ml. of diethylene-glycol dimethyl ether is treated with 19.1 g. of 4-methyl-2-phenyl-2H-1,4-benzothiazin-3(4H)-one and the mixture is heated at 95–105° for one hour, then cooled to room temperature. This mixture is treated with a toluene solution of 2-dimethylaminoethyl chloride (liberated from a concentrated solution of 16.0 gm. of the hydrochloride with ammonia water and extracted with toluene, followed by a brief drying over magnesium sulfate), stirred at room temperature for fifteen minutes and heated at 105° for three hours. After standing overnight at room temperature, the solvent is removed by distillation under reduced pressure on a steam bath. The residue is cooled, treated with 100 ml. of water and the mixture extracted several times with ether. The ether phases are combined, dried over magnesium sulfate and then concentrated to give 25 g. of 2-dimethylamino - ethyl - 4 - methyl - 2 - phenyl - 2H - 1,4 - benzothiazine-3(4H)-one. This free base is dissolved in 100 ml. of isopropyl alcohol and treated with a solution of 7 g. of oxalic acid in 50 ml. of isopropyl alcohol. The product first separates as an oil which changes to a pale yellow granular solid; yield 27.3 g., M.P. 112–115°. This material is dissolved in 300 ml. of butanone, filtered (a small amount of insoluble material remains) and cooled to give the oxalate hemihydrate as a colorless solid, M.P. 112–115°.

EXAMPLE 2

*2-(3-Dimethylaminopropyl)-4-Methyl-2-Phenyl-2H-1,4-Benzothiazine-3(4H)-One*

By substituting 3-dimethylaminopropyl chloride for 2-dimethylaminoethyl chloride in part (b) of Example 1, 2 - (3 - dimethylaminopropyl) - 4 - methyl - 2 - phenyl-2H-1,4-benzothiazine-3(4H)-one is obtained.

EXAMPLE 3

*2-(2-Diethylaminoethyl)-4-(2-Phenethyl)-2-Phenyl-2H-1,4-Benzothiazine-3(4H)-One*

(a) 4 - (2 - phenethyl) - 2 - phenyl - 2H - 1,4 - benzothiazine-3-(4H)-one is prepared by substituting phenethyl bromide for the methyl iodide in the procedure of Example 1(a).

(b) 2 - (2 - diethylaminoethyl) - 4 - (2 - phenethyl) - 2 - phenyl-2H-1,4-benzothiazine-3(4H)-one hydrochloride is prepared by the reaction of the product of part (a) above with 2-diethylaminoethyl chloride according to the procedure used in Example 1.

EXAMPLE 4

*2-[2-(4-Morpholinyl)Ethyl]-4-Methyl-2-Phenyl-2H-1,4-Benzothiazine-3-(4H)-One*

2 - [2 - (4-morpholinyl)ethyl] - 4 - methyl- 2 - phenyl-2H-1,4-benzothiazine-3(4H)-one is obtained by substituting 2-(morpholinyl)ethyl chloride for the 2-dimethylaminoethyl chloride in the procedure used in Example 1(b).

EXAMPLE 5

*2-(2-Dimethylaminoethyl)-2,3-Dihydro-5-Methyl-2-Phenyl-1,5-Benzothiazepin-4(5H)-One*

(a) A suspension of 7.8 g. of sodamide in 500 ml. of dry toluene is stirred and treated with a suspension of 51.0 g. of 2,3 - dihydro - 2-phenyl-1,5-benzothiazepin-4(5H)-one (J. Chem. Soc., 1927, p. 2738), and the mixture stirred for fifteen minutes at room temperature. The resulting solution is treated with 28.4 g. of methyl iodide and the mixture then stirred and heated at 60–65° for three hours. After cooling, the mixture is treated with 200 ml. of water and the product, 2,3-dihydro-5-methyl-2-phenyl-1,5-benzothiazepine-4(5H)-one, is isolated by evaporation of the toluene solution under reduced pressure.

(b) A solution of 26.6 g. of triphenylmethyl sodium in 2 l. of ether is treated with 26.9 g. of material from part (a), the mixture is stirred for a period of one hour and then treated with a solution of 12 g. of 2-dimethylaminoethyl chloride in 200 ml. of ether. The mixture is refluxed for three hours, cooled and treated with 100 ml. of water. The ether phase is dried over magnesium sulfate, filtered and the solvent evaporated to give 2-(2-dimethylaminoethyl) - 2,3 - dihydro -5 - methyl - 1,5 - benzothiazepin-4(5H)-one.

EXAMPLE 6

2-[2-(4-Piperidino)Ethyl]-2,3-Dihydro-5-Methyl-2-Phenyl-1,5-Benzothiazepin-4-(5H)-One By substituting 2-piperidinoethyl chloride for the 2-dimethylaminoethyl chloride in the procedure of Example 5(b), 2 - [2 - (4-piperidinoethyl]-2,3-dihydro-5-methyl-2-phenyl-1,5-benzothiazepin-4(5H)-one is obtained.

EXAMPLE 7

3-(3-Dimethylaminopropyl)-2,3-Dihydro-2,5-Dimethyl-3-Phenyl-1,5-Benzothiazepin-4(5H)-One (a) A mixture of 20.4 g. of α-phenylcrotonic acid and 15.7 g. of 2-aminothiophenol is heated at 160–175° for 45 minutes. The mixture is cooled, dissolved in 100 ml. of isopropyl alcohol and diluted with 100 ml. of hexane. After cooling, the solid is filtered and the material (18 g.) crystallized from 250 ml. of isopropyl alcohol to give 14 g. of colorless 2,3-dihydro-2-methyl-3-phenyl-1,5-benzothiazepin-4(5H)-one, M.P. 200–202°. Recrystallization from 150 ml. of acetonitrile gives 12.0 g. of product, M.P. 206–207°.

(b) A suspension of 1.2 g. of sodamide in 100 ml. of dry toluene is treated with a suspension 8.0 g. of product from part (a) in 200 ml. of dry toluene and the mixture stirred at 60° for one hour and then treated with a solution of 5.0 g. of methyl iodide in 50 ml. of toluene. This mixture is then maintained at 95–105° for four hours, cooled and treated with 100 ml. of water. Evaporation of the toluene under reduced pressure yields 2,3-dihydro - 2,5 - dimethyl - 3 - phenyl - 1,5 - benzothiazepin-4(5H)-one which is further purified by crystallization.

(c) Interaction of 28.3 g. of material from part (b), 2.4 g. of sodium hydride and 12.2 g. of 3-dimethylaminopropyl chloride in diethyleneglycol dimethyl ether as in part (b) of Example 1 gives 3-(3-dimethylaminopropyl)-3 - phenyl - 2,3 - dihydro - 2,5 - dimethyl - 1,5 - benzothiazepin-4(5H)-one hydrochloride.

EXAMPLE 8

3-[2-(2-Pyrrolidyl)Ethyl]-2,3-Dihydro-2,5-Dimethyl-3-Phenyl-1,5-Benzothiazepin-4(5H)-One By substituting 2-pyrrolidylethyl chloride for the 3-dimethylaminopropyl chloride in the procedure of Example 7(c), 3-[2-(2-pyrrolidyl)ethyl]-2,3-dihydro-2,5-dimethyl - 3 - phenyl - 1,5-benzothiazepin-4(5H)one is obtained.

EXAMPLE 9

2-Dimethylaminoethyl-2-(P-Chlorophenyl)-4-Benzyl-6-Chloro-2H-1,4-Benzothiazine-3(4H)-One (a) 2-amino-4-chlorothiophenol [Farrington et al., Australian Jour. of Chem. 8, 545 (1958)] is heated at 170 to 180° C. with α-bromo-(p-chlorophenyl)acetic acid (prepared by refluxing p-chloromandelic acid with hydrogen bromide in concentrated sulfuric acid) to produce 6 - chloro-2-(p-chlorophenyl)-2H-1,4-benzothiazine-3(4H)-one.

(b) The above product is reacted with benzyl chloride by the procedure of Example 1(a) to obtain 4-benzyl - 6 - chloro - 2 - (p - chlorophenyl) - 2H - 1,4 - benzothiazine-3(4H)-one. Reaction of the latter with 2-dimethylaminoethyl chloride by the procedure of Example 1(b) produces 2-dimethylaminoethyl-2-(p-chlorophenyl)-4-benzyl-chloro-2H-1,4-benzothiazine-3(4H)-one.

EXAMPLE 10

2-(2-Diethylamino)-2-(P-Methoxyphenyl)-4-Methyl-6-Trifluoromethyl-2H-1,4-Benzothiazine-3(4H-)One By following the procedure of Example 9, but substituting 2-amino-4-trifluoromethylthiophenol and α-bromo-(p-methoxyphenyl)acetic acid for 2-amino-4-chlorothiophenol and α-bromo-(p-chlorophenyl)acetic acid, respectively, in part (a) and methyl iodide and 2-diethylaminoethyl chloride for benzyl chloride and 2-dimethylaminoethyl chloride, respectively, in part (b), 2-(2-diethylaminoethyl) - 2 - (p - methoxyphenyl - 4 - methyl - 6-trifluoromethyl-2H-1,4-benzothiazine-3(4H)-one is obtained.

EXAMPLE 11

2-(2-Dimethylaminoethyl) - 2,3-Dihydro-5-Alkyl-2-Phenyl-8-Bromo-1,5-Benzothiazepin-4(5H)-One By reacting 2-amino-5-bromothiophenol (Australian Jour. of Chem., supra) with cinnamic acid according to the procedure of Example 7 and further following that procedure substituting allyl bromide for methyl iodide and 2-dimethylaminoethyl chloride for 3-dimethylaminopropyl chloride, respectively yields 2-(2-dimethylaminoethyl)-2,3-dihydro-5-allyl-2-phenyl-8-bromo - 1,5 - benzothiazepin-4(5H)-one.

EXAMPLE 12

3-(3-Dimethylaminopropyl) - 2,3 - Dihydro-5-Methyl-3-Phenyl-7-Trifluoromethyl - 1,5 - Benzothiazepin-4(5H)-One By following the procedure of Example 7 but starting with 2-amino-4-trifluoromethylthiophenol and α-phenylacrylic acid, 3-(3-dimethylaminopropyl)-2,3-dihydro-5-methyl-3-phenyl-7-trifluoromethyl - 1,5 - benzothiazepin-4(5H)-one is produced.

The invention may be variously otherwise embodied within the scope of the appended claims.

What is claimed is:

1. A compound selected from the group consisting of bases of the formula

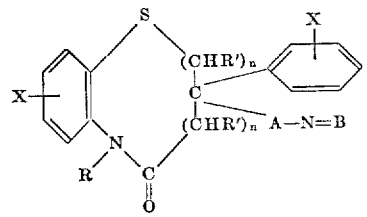

wherein R represents a member of the group consisting of lower alkyl, lower alkenyl, phenyl-lower alkyl and phenyl-lower alkenyl; R' represents a member of the group consisting of hydrogen and lower alkyl; X represents a member of the group consisting of hydrogen, lower alkyl, halogen, mono halo-lower alkyl, trifluoromethyl, and lower alkoxy; A represents lower alkylene; and N=B represents a basic nitrogen radical selected from the group consisting of amino, (lower alkyl)amino, di(lower alkyl)amino, (hydroxy-lower alkyl)amino, di(hydroxy-lower alkyl)amino and saturated 5 to 6-membered monocyclic heterocyclic radicals of less than 12 carbon atoms selected from the group consisting of piperidino, (lower alkyl)piperidino, di(lower alkyl)piperidino, (lower alkoxy)piperidino, pyrollidino, (lower alkoxy)pyrollidino, morpholino, (lower alkyl)morpholino, di(lower alkyl)morpholino, (lower alkoxy)morpholino, thiamorpholino, (lower alkyl)thiamorpholino, di(lower alkyl)thiamorpholino, (lower alkoxy)thiamorpholino, piperazino, (lower alkyl)piperazino, di(lower alkyl)piperazino and (lower alkoxy)piperazino, and n represents an integer from 0 to 1, at least one n being 0, and pharmaceutically acceptable acid addition salts of said bases.

2. A compound of the formula

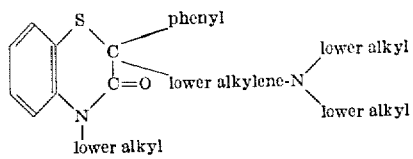

3. A compound of the formula

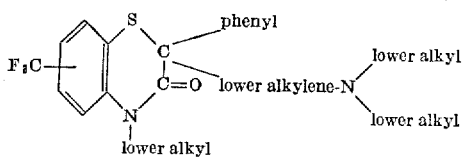

4. A compound of the formula

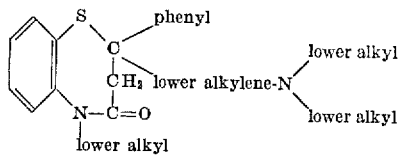

5. A compound of the formula

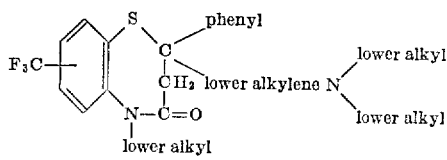

6. A compound of the formula

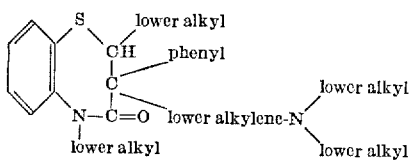

7. A compound of the formula

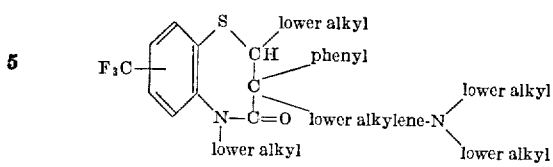

8. 2-(dimethylaminoethyl) - 4 - methyl-2-phenyl-2H-1,4-benzothiazine-3(4H)-one.

9. 3-(3-dimethylaminopropyl) - 2,3 - dihydro-2,5-dimethyl-3-phenyl-1,5-benzothiazepin-4(5H)-one.

References Cited in the file of this patent

UNITED STATES PATENTS

| | | |
|---|---|---|
| 2,887,483 | DeStevens | May 19, 1959 |
| 2,956,055 | Laubach | Oct. 11, 1960 |
| 2,963,476 | DeStevens | Dec. 6, 1960 |
| 3,006,916 | Winthrop et al. | Oct. 31, 1961 |

OTHER REFERENCES

Unger et al.: Chem. Berichte, volume 30, pages 2393–6 (1897).

Mills et al.: Jour. Chem. Soc., 1927, pages 2738–53.

Noller: Textbook of Organic Chemistry, second edition, W. B. Saunders Company, Philadelphia, Pa., (1958) page 323.

UNITED STATES PATENT OFFICE
CERTIFICATE OF CORRECTION

Patent No. 3,089,872                                May 14, 1963

John Krapcho

It is hereby certified that error appears in the above numbered patent requiring correction and that the said Letters Patent should read as corrected below.

Column 2, lines 69 to 71, formula (VI) should appear as shown below instead of as in the patent:

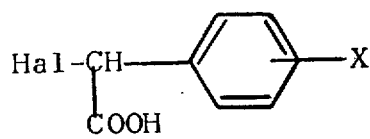

Column 5, line 69, for "-(2-Diethylamino)-", in italics, read -- -(2-Diethylaminoethyl)- --, in italics.

Signed and sealed this 17th day of December 1963.

(SEAL)
Attest:
ERNEST W. SWIDER

Attesting Officer

EDWIN L. REYNOLDS
Acting    Commissioner of
              Patents